(12) United States Patent
Abe et al.

(10) Patent No.: US 10,471,641 B2
(45) Date of Patent: Nov. 12, 2019

(54) METHODS FOR CONTROLLING POLYMER CHAIN SCISSION

(71) Applicant: Univation Technologies, LLC, Houston, TX (US)

(72) Inventors: Daudi A. Abe, Freeport, TX (US); Brandon C. Locklear, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 203 days.

(21) Appl. No.: 15/545,401

(22) PCT Filed: Jan. 20, 2016

(86) PCT No.: PCT/US2016/014087
§ 371 (c)(1),
(2) Date: Jul. 21, 2017

(87) PCT Pub. No.: WO2016/118599
PCT Pub. Date: Jul. 28, 2016

(65) Prior Publication Data
US 2018/0001537 A1    Jan. 4, 2018

Related U.S. Application Data

(60) Provisional application No. 62/105,923, filed on Jan. 21, 2015.

(51) Int. Cl.
*C08F 8/50* (2006.01)
*C08F 110/02* (2006.01)
(Continued)

(52) U.S. Cl.
CPC ............. *B29C 48/92* (2019.02); *B29C 48/04* (2019.02); *B29C 48/08* (2019.02); *B29C 48/10* (2019.02);
(Continued)

(58) Field of Classification Search
CPC ..... B29C 48/04; B29C 48/08; B29C 48/2692; B29C 48/69; B29C 48/693; B29C 48/92;
(Continued)

(56) References Cited

U.S. PATENT DOCUMENTS 3,354,250 A * 11/1967 Killoran et al. ........ B29C 48/69
264/211.22
3,608,001 A     9/1971 Kowalski et al.
(Continued)

FOREIGN PATENT DOCUMENTS

| EP | 0701890 | 3/1996 |
|----|---------|--------|
| EP | 2256160 | 12/2010 |
| WO | 87/05259 | 9/1987 |

OTHER PUBLICATIONS

International Preliminary Report on Patentability for related PCT Application PCT/US2016/014087, dated Aug. 3, 2017 (8 pgs).
(Continued)

*Primary Examiner* — Leo B Tentoni
(74) *Attorney, Agent, or Firm* — Brooks, Cameron & Huebsch, PLLC (57) ABSTRACT

Methods for extrusion of polyolefins (110) that utilize melt temperature to control molecular weight and also reduce gels. Disclosed herein is an example method for controlling polymer chain scission in an extrusion system (100), comprising: melting a polyolefin resin (110) in extruder (102) at a first melt temperature to form a first melt (112); passing the first melt (112) through a screen pack (106); forming the first melt 112) into a first polyolefin product (116, 118); melting additional polyolefin resin (110) of the same grade in the extruder (102) at a second melt temperature to form a second melt (112), wherein the second melt temperature differs from the first melt temperature by 5° C. or more to control chain scission in the extruder (102); passing the second melt (112)
(Continued)

through the screen pack (106); and forming the second melt (112) into a second polyolefin product (116, 118).

18 Claims, 1 Drawing Sheet

(51) Int. Cl.
*C08F 110/06* (2006.01)
*B29C 48/92* (2019.01)
*B29C 48/04* (2019.01)
*B29C 48/08* (2019.01)
*B29C 48/10* (2019.01)
*B29C 48/25* (2019.01)
*B29C 48/693* (2019.01)
*B29C 48/70* (2019.01)
*B29C 48/255* (2019.01)
*B29C 48/69* (2019.01)
*B29K 23/00* (2006.01)
*B29C 48/37* (2019.01)

(52) U.S. Cl.
CPC ........ B29C 48/254 (2019.02); B29C 48/2552 (2019.02); B29C 48/268 (2019.02); B29C 48/2692 (2019.02); B29C 48/69 (2019.02); B29C 48/693 (2019.02); B29C 48/705 (2019.02); B29C 48/37 (2019.02); *B29C 2948/922* (2019.02); *B29C 2948/92047* (2019.02); *B29C 2948/92209* (2019.02); *B29C 2948/92219* (2019.02); *B29C 2948/92542* (2019.02); *B29C 2948/92695* (2019.02); *B29C 2948/92704* (2019.02); *B29C 2948/92714* (2019.02); *B29C 2948/92876* (2019.02); *B29K 2023/04* (2013.01); *B29K 2023/06* (2013.01); *B29K 2023/10* (2013.01); *B29K 2023/12* (2013.01); *C08F 2810/10* (2013.01); *Y02P 70/263* (2015.11)

(58) Field of Classification Search
CPC .... B29C 2948/922; B29C 2948/92695; B29K 2023/04; B29K 2023/06; B29K 2023/10; B29K 2023/12; C08F 8/50; C08F 110/02; C08F 110/06; C08F 2810/10
USPC ........ 264/141, 142, 143, 169, 176.1, 211.21, 264/211.23, 331.17; 526/348, 351, 352
See application file for complete search history.

(56) References Cited

U.S. PATENT DOCUMENTS 6,951,904 B1 * 10/2005 Peeters ............... C08F 8/00
525/265
2013/0176810 A1 * 7/2013 Kuroda ............... B29C 48/08
366/69

OTHER PUBLICATIONS

International Search Report & Written Opinion for related PCT Application PCT/US2016/014087, dated Apr. 28, 2016 (13 pgs).

* cited by examiner

METHODS FOR CONTROLLING POLYMER CHAIN SCISSION

This application is a National Stage Application under 35 U.S.C. § 371 of International Application Number PCT/US2016/014087, filed Jan. 20, 2016 and published as WO 2016/118599 on Jul. 28, 2016, which claims the benefit to U.S. Provisional Application 62/105,923, filed Jan. 21, 2015, the entire contents of which are incorporated herein by reference in its entirety.

FIELD

This disclosure generally relates to controlling polymer chain scission. In particular, this disclosure relates to methods for extrusion of polyolefins that utilize melt temperature to control molecular weight and also reduce gels.

BACKGROUND

In the gas phase process for production of polyolefins such as polyethylene, a gaseous alkene (e.g., ethylene), hydrogen, co-monomer and other raw materials may be converted to solid polyolefin product. Generally, gas phase reactors may include a fluidized bed reactor, a compressor, and a cooler (heat exchanger). The reaction may be maintained in a two-phase fluidized bed of granular polyethylene and gaseous reactants by the fluidizing gas which is passed through a distributor plate near the bottom of the reactor vessel. Catalyst is added to the fluidized bed. Heat of reaction may be transferred to the circulating gas stream. This gas stream may be compressed and cooled in the external recycle line and then is reintroduced into the bottom of the reactor where it passes through a distributor plate. Make-up feedstreams are added to maintain the desired reactant concentrations.

The properties of the polymer formed by such a process can be controlled to some extent by varying the operating conditions, including the operating temperature, comonomer amount, and type and quantity of catalyst. Such properties include the molecular weight of the polymer product, the molecular weight distribution of the polymer product, polymer density, and the flow index of the polymer product. The properties of the polymer product as extracted from the reactor system, as well as in processed form for sale to customers, may also important. Typically, polymer product is extracted from the reactor and extruded into a more manageable form, such as pellets or bars. Therefore, it would be desirable to control the molecular weight of the polymer after extraction from the reactor to some extent.

SUMMARY

Disclosed herein is an example method for controlling polymer chain scission in an extrusion system, comprising: melting a polyolefin resin in extruder at a first melt temperature to form a first melt; passing the first melt through a screen pack; forming the first melt into a first polyolefin product; melting additional polyolefin resin of the same grade in the extruder at a second melt temperature to form a second melt, wherein the second melt temperature differs from the first melt temperature by 5° C. or more to control chain scission in the extruder; passing the second melt through the screen pack; and forming the second melt into a second polyolefin product.

Disclosed herein is an example method for controlling polymer chain scission in an extrusion system, comprising: providing a polyolefin resin having a molecular weight; selecting a melt temperature for an extruder to cause scission of the polyolefin with decrease in molecular weight; melting the polyolefin resin in the extruder at the melt temperature to form a melt; and forming the melt into a polyolefin product.

BRIEF DESCRIPTION OF THE DRAWINGS

For a detailed description of the preferred embodiments of the invention, reference will now be made to the accompanying drawings in which.

DETAILED DESCRIPTION

Before the present compounds, components, compositions, devices, equipment, configurations, schematics, systems, and/or methods are disclosed and described, it is to be understood that unless otherwise indicated this invention is not limited to specific compounds, components, compositions, devices, equipment, configurations, schematics, systems, methods, or the like, as such may vary, unless otherwise specified. It is also to be understood that the terminology used herein is for the purpose of describing particular embodiments only and is not intended to be limiting.

This disclosure generally relates to controlling the molecular weight of polyolefins. In particular, this disclosure relates to methods and systems for extrusion of polyolefins that utilize the melt temperature to control molecular weight. The melt temperature may also be used to reduce gels. Screen packs may also be used to reduce gels. Increasing melt temperature may cause scission of the polyolefin that can increase the melt index with resulting decrease in molecular weight. Thus, the polyolefin may be intentionally modified in the extruder to cause the flow index to purposely shift upward for making a lower molecular weight polyolefin. This may allow a single polyolefin grade to be made in the polymerization process, while the extruder may be used to make different polymer molecular weights by controlled scission.

In addition to controlling molecular weight, the extrusion temperature may also be used to control gels. For example, use of increased temperatures in the extruder can reduce gels in the polyolefin. Increased melt temperature in the extruder may be used in combination with the screen packs to reduce gels. One example technique for gel reduction may include an extrusion system that comprises directing a melted polyolefin through a screen pack. The screen pack may comprise a plurality of screens positioned in series, wherein the screens comprise an inlet screen having a size of from 20 mesh to 80 mesh, an intermediate screen having a size of 100 mesh or greater, and an outlet screen having a size of from 20 mesh to 80 mesh. As used herein, all references to screen size are based on the U.S. Sieve Series. Advantageously, passing the melted polyolefin through the screen pack should break up and disperse gels in the melted polyolefin, resulting in polyolefin products with a reduced gel count.

Extrusion Process

Figure 1:
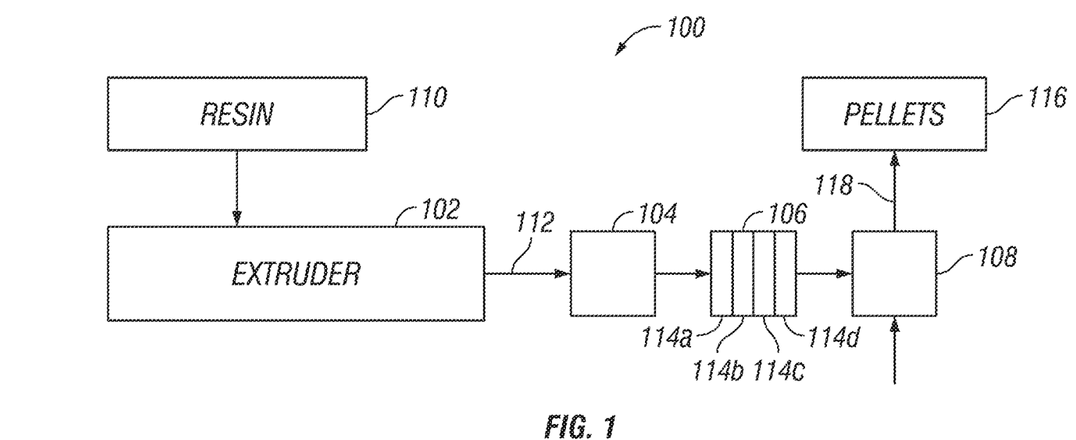
FIG. 1 is a schematic diagram of an example extrusion system that can be used in a method to form a polyolefin product.

FIG. 1 illustrates an example pelletization-based extrusion system 100 that can be used in a method to form a polyolefin product while controlling molecular weight. The pelletization-based extrusion system 100 may include an extruder 102, a melt pump 104, a screen pack 106, and a pelletizer 108. In the extrusion system 100, a resin 110 may be fed to the extruder 102. The resin 110 may be in the form of powder, pellets, spheres, solution, or in any other form suitable for extrusion. The resin 110 may include polyolefin, such as polyethylene or polypropylene. For example, in one embodiment, the resin 110 may be a high density polyethylene used for pipe, bags, and other applications. In some embodiments, the resin 110 may be a bimodal polyethylene. In other embodiments, the resin 112 may be a linear low density polyethylene that is used for film applications.

In the extruder 102, the resin 110 may be heated and softened to form a melt 112. The extruder 102 generally may be a device for forming the melt 112 and optionally blending additives with the melt 112. While not illustrated, the extruder 102 may have single or twin screws placed in a barrel, which can have minimal clearance between the screws and the inner surface of the barrel. Each screw may have a spiral ridge, or flights, that form openings between the barrel and the screw. The depth of the flight may be changed to change the shear and stress applied to the resin 110, with shallower flights creating a higher stress environment. As the shaft of the screws are turned, the resin 110 is sheared in the flights creating friction that melts or heats the resin 110 as it is forced down the barrel. The melt 112 may be forced out an opening at the end of the barrel into downstream equipment, such as melt pump 104. The extruder 102 may be a standard extruder configured to form the melt 112 from the resin 110 or may be a devolatizing extruder configured to remove solvent from a plastic in a solution to form the melt 112. Embodiments disclosed herein are not limited to extruders, but may also use polymer mixers, which may use counter rotating, non-intermeshed blending elements to impart shear to a resin, forming the melt 112.

The extruder 102 may be any number of melt-processing extruders and devolatilization extruders of any design, including, for example, twin-screw extruders marketed by Coperion GMBH, of Stuttgart Germany, under the ZSK trade name and twin-rotor mixers marketed by KOBELCO, Kobe Steel Ltd. of Tokyo Japan, under the LCM trade name. Other extruders that may be used in the present technique include those marketed by David-Standard, LLC of Pawcatuck, Conn., USA, and KraussMaffei Berstorff GMBH of Hannover, Germany. It should be noted that the listed extruders are merely exemplary, as any number of single-screw or twin-screw extruders from these or other suppliers may be used.

The use of increased melt temperatures can thus have several advantages, including controlled scission and gel reduction. In some embodiments, scission of the polyolefin in the extruder 102 may be controlled by controlling temperature. For example, polyolefins with two or more different molecular weights may be made from a single polyolefin grade by controlling scission of the polyolefin in the extruder 102. In some embodiments, resin 110 may be heated in extruder 102 to a first melt temperature to provide a polyolefin with a first molecular weight. At a desired time, the melt temperature may be adjusted such that the resin 110 may be heated in the extruder 102 to as second melt temperature with a second molecular weight. If the second melt temperature is greater than the first melt temperature the second molecular weight should be lower than the first molecular weight. In particular embodiments, the second melt temperature may greater than the first melt temperature in an amount of 5° C., 10° C., 20° C., 30° C., 40° C., 50° C., or even more. If the second melt temperature is less than the first melt temperature, then the second molecular weight should be greater than the first molecular weight. In particular embodiments, the second melt temperature may less than the first melt temperature in an amount of 5° C., 10° C., 20° C., 30° C., 40° C., 50° C., or even more. In this manner, a single grade of resin produced in a polyolefin process may be used to produce polyolefin products with different molecular weights by controlling scission in the extruder 102. For an increase of melt temperature of around 15° C. or even greater, the melt index may be increased by as high as three times.

The melt 112 produced in the extruder 102 may be directed to a melt pump 104, which forces the melt 112 through a screen pack 106. The screen pack 106 may be used to remove solid contaminants, as well as gelled or cross-linked resin from the melt 112. By stretching out the polyolefin, the screen pack 106 can reduce gels and improve quality of the polyolefin. Standard screen packs typically use 20-mesh screens. To avoid undesired pressure drops across the screen pack 106, the use of tighter screens has typically been avoided. Screens are typically characterized by their mesh size, which is typically a measure of the number of openings per square inch of the screen. As used herein, all references to screen size are based on the U.S. Sieve Series.

Embodiments of the screen pack 106 may contain a plurality of screens 114a-114d arranged in series. To reduce gels, one or more of the screens 114a-114d may be tighter than 20 mesh. For example, the screen pack 106 may comprise an inlet screen 114a having a size of from 20 mesh to 80 mesh, one or more intermediate screens 114b, 114c having a size of 100 mesh or greater, and an outlet screen 114d having a size of from 20 mesh to 80 mesh. The advantages of passing the melt 112 through screen arrangement in the screen pack 106 includes breaking up and dispersion of gels in the melt 112 resulting in a polyolefin with a reduced gel count. In some embodiments, one or both of the inlet screen 114a or the outlet screen 114d may have a size of 20 mesh. In some embodiments, one or more of the intermediate screens 114b, 114c may have a screen size of from 200 mesh to 250 mesh and, alternative, at least one of the intermediate screens 114b, 114c may have a screen size as high as 400 mesh. While FIG. 1 illustrates the screen pack 106 as having two intermediate screens 114b, 114c, it should be understand that embodiments encompass using more or less than two intermediate screens 114b, 114c in the screen pack 106. For example, embodiments may include 3, 4, or even more intermediate screens 114b, 114c. In addition, specific embodiments may include one or more intermediate screens (not shown) having a screen size from 20 mesh to 80 mesh that is line with the intermediate screens 114b, 114c of 100 mesh or greater. It may be desirable, in some embodiments, to stagger the screen size in the screen pack, for example, alternating coarse screens (e.g. 20 mesh to 80 mesh) and fine screens (100 mesh or larger). For example, the intermediate screens 114b, 114c may include a coarse screen (e.g., 20 mesh to 80 mesh) sandwiched between fine screens (100 mesh or larger). Specific examples of screen arrangements that may be used in the screen pack 106 include, without limitation, 20-100-20, 20-250-100-20, 20-400-100-20, 20-100-20-100-20, and 20-250-20-250-100-20.

To avoid undesired pressure drop when utilizing tighter screens 114a-114d in the screen pack 106, the throughput area of the screen pack 106 may be increased. In other words, channel size through the screen pack 106 may be increased. By way of example, the channel through the screen pack 106 may be increased as much as 50% as compared to prior screen packs, for example, from 0.263 ft² (244 cm²) to 0.370 ft² (344 cm²).

From the screen pack 106, the melt 112 can be fed to a pelletizer 108. Pellets 116 can be isolated from a conveying liquid 118 from the pelletizer 108. Pelletizers are well known any of a variety of suitable pelletizers or pelletizing systems may be used. While pellets 116 are illustrated, other configurations of the pelletization-based extrusion system 100 may be used in the production of alternative polyolefin products, including pipe, sheet, film, or any number of other products.

Figure 2:
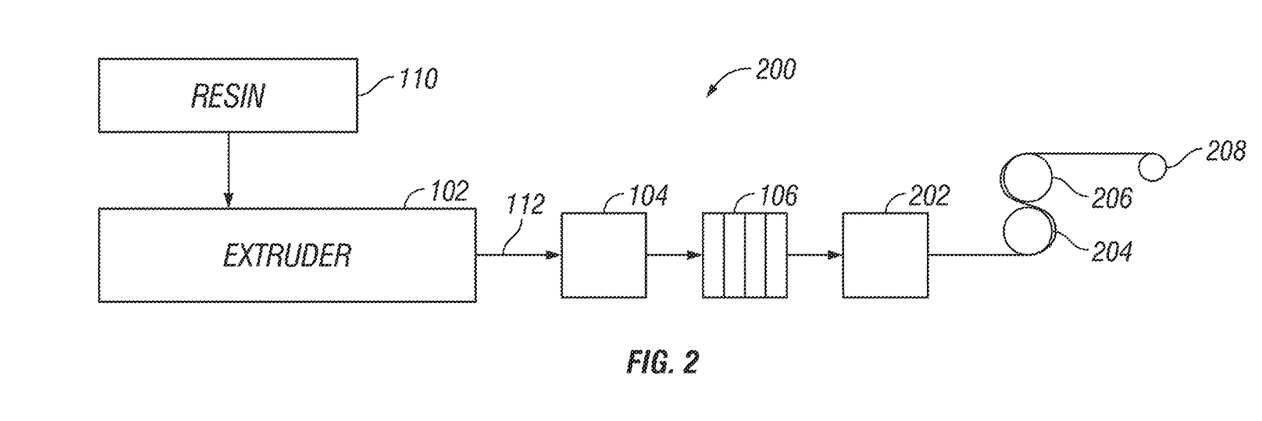
FIG. 2 is a schematic diagram of another example extrusion system that can be used in a method to form a polyolefin product.

FIG. 2 illustrates a film-based extrusion system 200 that can be used in a method to form a polyolefin product with reduced gels. The embodiment of FIG. 2 is similar to FIG. 1 except rather producing pellets 116, the film-based extrusion system 100 includes components for film production. As illustrated, resin 110 may be fed to the extruder 110 where the resin 110 is heated and softened to form the melt 112. The melt 112 from the extruder may be directed to the melt pump 104 which forces the melt 112 through the screen pack 106. The melt 112 from the screen pack 106 may be fed to a die 202 with orifices (not shown) forming a polyolefin film which may then be passed through rolls 204, 206 to storage roll 208 whereupon the polyolefin film may be wound and stored.

The illustrated pelletization-based extrusion system 100 shown and described with reference to FIG. 1 and the film-based extrusion system 200 shown and described with reference to FIG. 2 are for use with any polymerization process. Suitable polymerization processes may include solution polymerization, gas phase polymerization, slurry phase polymerization, high-pressure polymerization, or a combination thereof.

Polymerization Process

Embodiments for producing the polyolefins disclosed herein may employ any suitable process for the polymerization of olefins, including any suspension, solution, slurry, or gas phase process, using known equipment and reaction conditions, and are not limited to any specific type of polymerization system.

In general, the polymerization process may be a continuous gas phase process, such as a fluid bed process. A fluid bed reactor for use in the process of the present invention typically has a reaction zone and a so-called velocity reduction zone (disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

Useful gas phase polymerization processes include those that utilize a fluidized bed reactor. This type of reactor, and means for operating the reactor, are well known and are described in, for example, U.S. Pat. Nos. 3,709,853; 4,003,712; 4,011,382; 4,302,566; 4,543,399; 4,882,400; 5,352,749; 5,541,270; EP-A-0 802 202. These patents disclose gas phase polymerization processes wherein the polymerization medium is either mechanically agitated or fluidized by the continuous flow of the gaseous monomer and diluent.

The process described herein is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms in one embodiment. In other embodiments, ethylene and a comonomer comprising from 3 to 12 carbon atoms, or from 4 to 10 carbon atoms, or from 4 to 8 carbon atoms, may be used.

In embodiments, polyethylene may be prepared by the process disclosed herein. Such polyethylene may include homopolymers of ethylene and interpolymers of ethylene and at least one alpha-olefin wherein the ethylene content is at least about 50% by weight of the total monomers involved. Olefins that may be used herein include ethylene, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. The content of the alpha-olefin incorporated into the copolymer may be no greater than 30 mol % in total, or may be from 3 to 20 mol %. The term "polyethylene" when used herein is used generically to refer to any or all of the polymers comprising ethylene described above.

In other embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpentene-1, 1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1, 1,5-cyclooctadiene, 5-vinylidene-2-norbornene and 5-vinyl-2-norbornene, and olefins formed in situ in the polymerization medium. In one embodiment, the content of the alpha-olefin comonomer incorporated into a propylene-based polymer may be no greater than 49 mol % in total, from 3 to 35 mol % in other embodiments.

Hydrogen gas is often used in olefin polymerization to control the final properties of the polyolefin. Increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of the present invention may be an amount necessary to achieve the desired MFI or MI of the final polyolefin resin. Melt flow rate for polypropylene may be measured according to ASTM D 1238 (230° C. with 2.16 kg weight); melt index ($I_2$) for polyethylene may be measured according to ASTM D 1238 (190° C. with 2.16 kg weight).

Other gas phase processes contemplated include series or multistage polymerization processes. For example, a staged reactor employing two or more reactors in series may be used, wherein one reactor may produce, for example, a high molecular weight component and another reactor may produce a low molecular weight component. In some embodiments, the polyolefin is produced using a staged gas phase reactor. Such polymerization systems are described in, for example, U.S. Pat. Nos. 5,627,242; 5,665,818; and 5,677,375; and European publications EP-A-0 794 200; EP-B1-0 649 992, EP-A-0 802 202 and EP-B-634 421.

In one embodiment, the one or more reactors in a gas phase or fluidized bed polymerization process may have a pressure ranging from about 0.7 to about 70 bar (about 10 to about 1000 psia), or from about 14 to about 42 bar (about 200 to about 600 psia). In one embodiment, the one or more reactors may have a temperature ranging from about 10° C. to about 150° C., or from about 40° C. to about 125° C. In one embodiment, the reactor temperature may be operated at the highest feasible temperature taking into account the sintering temperature of the polymer within the reactor. In one embodiment, the superficial gas velocity in the one or more reactors may range from about 0.2 to about 1.1 meters/second (about 0.7 to about 3.5 feet/second), or from about 0.3 to about 0.8 meters/second (about 1.0 to about 2.7 feet/second).

Some embodiments of this disclosure may be especially useful with gas phase polymerization systems, at pressures in the range from 0.07 to 68.9 bar (1 to 1000 psig), from 3.45 to 27.6 bar (50 to 400 psig) in some embodiments, from 6.89 to 24.1 bar (100 to 350 psig) in other embodiments, and temperatures in the range from 30 to 130° C., or from 65 to 110° C., from 75 to 120° C. in other embodiments, or from 80 to 120° C. in other embodiments. In some embodiments, operating temperatures may be less than 112° C. Stirred or fluidized bed gas phase polymerization systems may be of use in embodiments.

The polymerization process may be a continuous gas phase process that includes the steps of: (a) introducing a recycle stream (including ethylene and alpha olefin monomers) into the reactor; (b) introducing the supported catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

In embodiments, one or more olefins, $C_2$ to $C_{30}$ olefins or alpha-olefins, including ethylene or propylene or combinations thereof, may be prepolymerized in the presence of a metallocene catalyst system prior to the main polymerization. The prepolymerization may be carried out batch-wise or continuously in gas, solution or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and WO 97/44371.

Any type of polymerization catalyst may be used, including liquid-form catalysts, solid catalysts, and heterogeneous or supported catalysts, among others, and may be fed to the reactor as a liquid, slurry (liquid/solid mixture), or as a solid (typically gas transported). Liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. Examples of suitable catalysts include:

A. Ziegler-Natta catalysts, including titanium-based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium-based catalysts, such as those described in U.S. Pat. Nos. 3,709,853; 3,709,954; and 4,077,904.

C. Vanadium-based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Pat. Nos. 4,472,559 and 4,182,814.

G. Nickel catalysts and mixtures thereof, such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.

I. Any combination of one or more of the catalysts of the above.

Examples of suitable Ziegler-Natta catalyst compounds are disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973; 5,525,678; 5,288,933; 5,290,745; 5,093,415 and 6,562,905. Examples of such catalysts include those having Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts can be used. Conventional type transition metal catalysts include traditional Ziegler-Natta catalysts in U.S. Pat. Nos. 4,115,639, 4,077,904, 4,482,687, 4,564,605, 4,721,763, 4,879,359 and 4,960,741. Conventional-type transition metal catalysts can be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Preferred conventional-type transition metal catalyst compounds include transition metal compounds from Groups 3 to 17, or Groups 4 to 12, or Groups 4 to 6.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art.

Suitable chromium catalysts include di-substituted chromates, such as $CrO_2(OR)_2$; where R is triphenylsilane or a tertiary polyalicyclic alkyl. The chromium catalyst system can further include $CrO_3$, chromocene, silyl chromate, chromyl chloride ($CrO_2Cl_2$), chromium-2-ethyl-hexanoate, chromium acetylacetonate ($Cr(AcAc)_3$), and the like. Illustrative chromium catalysts are further described in U.S. Pat. Nos. 3,231,550; 3,242,099; and 4,077,904.

Metallocenes are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components."

The Cp ligands are one or more rings or ring system(s), at least a portion of which includes $\pi$-bonded systems, such as cycloalkadienyl ligands and heterocyclic analogues. The ring(s) or ring system(s) typically include atoms selected from Groups 13 to 16 atoms, or the atoms that make up the Cp ligands can be selected from carbon, nitrogen, oxygen, silicon, sulfur, phosphorous, germanium, boron and aluminum and combinations thereof, wherein carbon makes up at least 50% of the ring members. Or, the Cp ligand(s) can be selected from substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof, and heterocyclic versions thereof.

In one aspect, the one or more metallocene catalyst components are represented by the formula (I):

$$Cp^A Cp^B MX_n \qquad (I)$$

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 4, 5 and 6 atoms in yet a more particular embodiment, and a Ti, Zr, Hf atoms in yet a more particular embodiment, and Zr in yet a more particular embodiment. The groups bound the metal atom "M" is such that the compounds described below in the formulas and structures are neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

M is as described above; each X is chemically bonded to M; each Cp group is chemically bonded to M; and n is 0 or an integer from 1 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof.

More particular non-limiting examples of alkyl substituents R associated with formula (i) includes methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (I) is independently selected from the group consisting of: any leaving group in one embodiment; halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In another embodiment, X is $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment.

In an embodiment, the metallocene catalyst compound and/or component may include those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes." $Cp^A$, $Cp^B$, M, X and n are as defined above for formula (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (I) including halogen radicals and iron. More particular non-limiting examples of bridging group (A) are represented by $C_1$ to $C_6$ alkylenes, substituted $C_1$ to $C_6$ alkylenes, oxygen, sulfur,  (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) are different from each other in one embodiment, and the same in another embodiment.

In yet another aspect, the metallocene catalyst components include mono-ligand metallocene compounds (e.g., mono cyclopentadienyl catalyst components) such as described in WO 93/08221 for example which is incorporated herein by reference.

In yet another aspect, the at least one metallocene catalyst component is an unbridged "half sandwich" metallocene represented by the formula (III):

$$Cp^A MQ_q X_n \qquad (III)$$

wherein $Cp^A$ is defined as for the Cp groups in (I) and is a ligand that is bonded to M; each Q is independently bonded to M; Q is also bound to $Cp^A$ in one embodiment; X is a leaving group as described above in (I); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (III), Q is selected from the group consisting of $ROO^-$, $RO—$, $R(O)—$, $—NR—$, $—CR_2—$, $—S—$, $—NR_2$, $—CR_3$, $—SR$, $—SiR_3$, $—PR_2$, $—H$, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In another embodiment, R is selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (II), such as described in, for example, U.S. Pat. No. 6,069,213:

$$Cp^A M(Q_2 GZ) X_n \text{ or } T(Cp^A M(Q_2 GZ) X_n)_m \qquad (IV)$$

Wherein:

M, $Cp^A$, X and n are as defined above;

$Q_2 GZ$ forms a polydentate ligand unit (e.g., pivalate), wherein at least one of the Q groups form a bond with M, and is defined such that each Q is independently selected from the group consisting of $—O—$, $—NR—$, $—CR_2—$ and $—S—$; G is either carbon or silicon; and Z is selected from the group consisting of R, $—OR$, $—NR_2$, $—CR_3$, $—SR$, $—SiR_3$, $—PR_2$, and hydride, providing that when Q is $—NR—$, then Z is selected from the group consisting of $—OR$, $—NR_2$, $—SR$, $—SiR_3$, $—PR_2$; and provided that neutral valency for Q is satisfied by Z; and wherein each R is independently selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In another embodiment, R is selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n is 1 or 2 in a particular embodiment;

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^A M(Q_2 GZ) X_n$" groups, and is chemically bonded to the $Cp^A$ groups;

m is an integer from 1 to 7; m is an integer from 2 to 6 in a more particular embodiment.

A as described above for (A) in structure (II), may be selected from the group consisting of a chemical bond, $—O—$, $—S—$, $—SO_2—$, $—NR—$, $=SiR_2$, $=GeR_2$, $=SnR_2$, $—R_2SiSiR_2—$, $RP=$, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, $—CH_2CH_2—$, $=CR_2$ and $=SiR_2$ in a more particular embodiment; wherein and R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment; wherein A may be absent in yet another embodiment, in which case each $R^*$ is defined as for $R^1$-$R^{13}$; each X is as described above in (I); n is an integer from 0 to 4, and from 1 to 3 in another embodiment, and 1 or 2 in yet another embodiment; and $R^1$ through $R^{13}$ are independently: selected from the group consisting of hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos. through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups in yet a more particular embodiment; wherein adjacent R groups may form a ring, either saturated, partially saturated, or completely saturated.

It is contemplated that the metallocene catalysts components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The "metallocene catalyst compound", also referred to herein as the metallocene catalyst component" may comprise any combination of any "embodiment" described herein.

Other suitable metallocenes include but are not limited to those described in U.S. Pat. Nos. 7,179,876, 7,169,864, 7,157,531, 7,129,302, 6,995,109, 6,958,306, 6,884748, 6,689,847, 6,309,997, 6,265,338, U.S. Pat. App. Pub. No. 2007/0055028, and U.S. Pat. App. Pub. No. 2006/019925, and published PCT App. Nos. WO 97/22635, WO 00/699/22, WO 01/30860, WO 01/30861, WO 02/46246, WO 02/50088, WO 04/026921, WO 06/019494, and WO 2010/039948.

In one or more embodiments, a "mixed" catalyst system or "multi-catalyst" system may be used. A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having the same or different metal group but having at least one different catalyst component, for example, a different ligand or general catalyst structure. Examples of useful bimetallic catalysts can be found in U.S. Pat. Nos. 6,271,325, 6,300,438, and 6,417,304. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise.

The described catalyst compounds may also be combined with one or more support materials or carriers. For example, in some embodiments, the activator is contacted with a support to form a supported activator wherein the activator is deposited on, contacted with, vaporized with, bonded to, or incorporated within, adsorbed or absorbed in, or on, a support or carrier.

Support materials may include inorganic or organic support materials, such as a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

The support materials may include inorganic oxides including Group 2, 3, 4, 5, 13 or 14 metal oxides, such as silica, fumed silica, alumina, silica-alumina and mixtures thereof. Other useful supports include magnesia, titania, zirconia, magnesium chloride, montmorillonite, phyllosilicate, zeolites, talc, clays, and the like. Also, combinations of these support materials may be used, for example, silica-chromium, silica-alumina, silica-titania and the like. Additional support materials may include those porous acrylic polymers described in EP 0 767 184. Other support materials include nanocomposites, as described in PCT WO 99/47598, aerogels, as described in WO 99/48605, spherulites, as described in U.S. Pat. No. 5,972,510, and polymeric beads, as described in WO 99/50311.

Support material, such as inorganic oxides, may have a surface area in the range from about 10 to about 700 m²/g, a pore volume in the range from about 0.1 to about 4 cc/g, and an average particle size in the range from about 0.1 to about 1000 μm. In other embodiments, the surface area of the support may be in the range from about 50 to about 500 m²/g, the pore volume is from about 0.5 to about 3.5 cc/g, and the average particle size is from about 1 to about 500 μm. In yet other embodiments, the surface area of the support is in the range from about 100 to about 1000 m²/g, the pore volume is from about 0.8 to about 5.0 cc/g, and the average particle size is from about 1 to about 100 μm, or from about 1 to about 60 μm. The average pore size of the support material may be in the range from 10 to 1000 Å; or from about 50 to about 500 Å; or from about 75 to about 450 Å.

There are various methods known in the art for producing a supported activator or combining an activator with a support material. In an embodiment, the support material is chemically treated and/or dehydrated prior to combining with the catalyst compound, activator and/or catalyst system. In embodiments, the support material may have various levels of dehydration, such as may be achieved by drying the support material at temperatures in the range from about 100° C. to about 1000° C.

In some embodiments, dehydrated silica may be contacted with an organoaluminum or alumoxane compound. In specifically the embodiment wherein an organoaluminum compound is used, the activator is formed in situ in the support material as a result of the reaction of, for example, trimethylaluminum and water.

The supported activator is formed by preparing, in an agitated, temperature and pressure controlled vessel, a solution of the activator and a suitable solvent, then adding the support material at temperatures from 0° C. to 100° C., contacting the support with the activator solution, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

In an embodiment, the weight percent of the activator to the support material is in the range from about 10 weight percent to about 70 weight percent, or in the range from about 15 weight percent to about 60 weight percent, or in the range from about 20 weight percent to about 50 weight percent, or in the range from about 20 weight percent to about 40 weight percent.

Conventional supported catalysts system useful in embodiments disclosed herein include those supported catalyst systems that are formed by contacting a support material, an activator and a catalyst compound in various ways under a variety of conditions outside of a catalyst feeder apparatus. Examples of conventional methods of supporting metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895, 5,939,348, 546,872, 6,090,740 and PCT publications WO 95/32995, WO 95/14044, WO 96/06187 and WO 97/02297, and EP-B1-0 685 494.

The catalyst components, for example a catalyst compound, activator and support, may be fed into the polymerization reactor as a mineral oil slurry. Solids concentrations in oil may range from about 1 to about 50 weight percent, or from about 10 to about 25 weight percent.

The catalyst compounds, activators and or optional supports used herein may also be spray dried separately or together prior to being injected into the reactor. The spray dried catalyst may be used as a powder or solid or may be placed in a diluent and slurried into the reactor. In other embodiments, the catalyst compounds and activators used herein are not supported.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 $m^2/g$. Silica has a primary particle size of about 5 to about 50 nanometers, an average size of aggregate of about 0.1 to about 30 microns, and a specific surface area from about 50 to about 500 $m^2/g$. Clay, talc, and polymeric materials have an average particle size of about 0.01 to about 10 microns and a specific surface area of about 3 to 30 $m^2/g$. These inert particulate materials may be used in amounts ranging from about 0.3 to about 80%, or from about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are well known to those skilled in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the circulation loops, riser, and/or downer separately or independently from the liquid catalyst if they are solids, or as part of the catalyst provided they do not interfere with the desired atomization. To be part of the catalyst solution, the additives should be liquids or capable of being dissolved in the catalyst solution.

In one embodiment of the process of the invention, the gas phase process may be operated in the presence of a metallocene-type catalyst system and in the absence of, or essentially free of, any scavengers, such as triethylaluminum, trimethylaluminum, triisobutylaluminum and tri-n-hexylaluminum and diethyl aluminum chloride, dibutyl zinc, and the like. By "essentially free," it is meant that these compounds are not deliberately added to the reactor or any reactor components, and if present, are present in the reactor at less than 1 ppm.

In embodiments, the reactors disclosed herein are capable of producing greater than 500 lbs of polymer per hour (227 kg/hr) to about 300,000 lbs/hr (136,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 Kg/hr) and most preferably greater than 65,000 lbs/hr (29,000 kg/hr) to greater than 150,000 lbs/hr (68,100 kg/hr).

The polymers produced by the processes described herein can be used in a wide variety of products and end-use applications. The polymers produced may include linear low density polyethylene, elastomers, plastomers, high density polyethylene, medium density polyethylene, low density polyethylene, polypropylene homopolymers and polypropylene copolymers, including random copolymers and impact copolymers.

The polymers, typically ethylene-based polymers, have a density, for example, in the range of from 0.86 g/cc to 0.97 g/cc, in another embodiment, in the range of from 0.88 g/cc to 0.965 g/cc, and, in yet another embodiment, in the range of from 0.900 g/cc to 0.96 g/cc.

In yet another embodiment, propylene-based polymers are produced. These polymers include atactic polypropylene, isotactic polypropylene, hemi-isotactic and syndiotactic polypropylene. Other propylene polymers include propylene block, random, or impact copolymers. Propylene polymers of these types are well known in the art, see for example U.S. Pat. Nos. 4,794,096, 3,248,455, 4,376,851, 5,036,034 and 5,459,117.

The polymers may be blended and/or coextruded with any other polymer. Non-limiting examples of other polymers include linear low density polyethylene produced via conventional Ziegler-Natta and/or bulky ligand metallocene catalysis, elastomers, plastomers, high pressure low density polyethylene, high density polyethylene, polypropylene, and the like.

Polymers produced by the processes disclosed herein and blends thereof are useful in such forming operations as film, sheet, and fiber extrusion and co-extrusion as well as blow molding, injection molding and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications.

Polymerization processes disclosed herein may also be operated in a condensing mode, similar to those disclosed in U.S. Pat. Nos. 4,543,399, 4,588,790, 4,994,534, 5,352,749, 5,462,999, and 6,489,408, and U.S. Patent Appl. Pub. No. 2005/0137364. Condensing mode processes may be used to achieve higher cooling capacities and, hence, higher reactor productivity. In addition to condensable fluids of the polymerization process itself, including monomer(s) and co-monomer(s), other condensable fluids inert to the polymerization may be introduced to induce a condensing mode operation, such as by the processes described in U.S. Pat. No. 5,436,304.

Polyolefins of particular embodiments may have a density from about 0.910 g/cm$^3$ to about 0.975 g/cm$^3$, from about 0.930 g/cm$^3$ to about 0.965 g/cm$^3$, from about 0.935 g/cm$^3$ to about 0.965 g/cm$^3$, from about 0.950 g/cm$^3$ to about 0.958 g/cm$^3$, or from about 0.952 g/cm$^3$ to about 0.954 g/cm$^3$ Polyolefins of particular embodiments may have melt indices ($I_2$) ranging from about 0.1 g/10 min to about 1000 g/10 min. In other embodiments, the polymers may have flow indices ($I_{21}$) ranging from about 0.3 g/10 min to about 300 g/10 min. In yet other embodiments, the polymers may have flow indices ($I_{21}$) ranging from about 0.5 g/10 min to about 50 g/10 min, from about 1 g/10 min to about 20 g/10 min, or from about 2 g/10 min to about 12 g/10 min, or from about 2.5 g/10 min to about 5 g/10 min.

Polyolefins of particular embodiments may have a melt index ratio ($I_{21}/I_2$) of from 14 to 60 in one embodiment, from 14 to 34 in another embodiment, from 15 to 30 in another embodiment, from 15 to 28 in yet another embodiment, or from 15 to 25 in yet another embodiment.

Polyolefins of particular embodiments may have a melt strength at yield of greater than about 1 cN in one embodiment, greater than about 2.0 cN in another embodiment, greater than about 2.5 cN in yet another embodiment, greater than about 3.0 cN in another embodiment, and greater than about 3.5 cN in yet another embodiment.

Test Methods

The following test methods should be utilized to obtain the numerical values for certain properties and features as set forth in the claims, e.g. density, flow indices or melt indices, although it is understood that those values also refer to any results obtained by other testing or measuring methods that might not necessarily be disclosed herein, provided such other testing or measuring methods are published, e.g., in at least one patent, patent application, or scientific publication.

Density values are based on ASTM D-792.

Flow Index ($I_{21}$) values are based on ASTM D1238, run at 190° C., with 21.6 kg weight; the standard designation for that measurement is 190/21.60.

Melt Index ($I_2$) values are based on ASTM D1238, run at 190° C., with 2.16 kg weight; the standard designation for that measurement is 190/2.16.

Melt Strength (MS) values are based on the polymer yield point in the melt strength curve generated with the Rheotens instrument with a starting velocity of 9.8 mm/sec and a velocity at yield in the range of about 32 to 33 mm/sec.

Molecular weight distribution ($M_w/M_n$) was determined using Size Exclusion Chromatography, which was measured using Polymer Laboratories instrument; Model: HT-GPC-220, Columns: Shodex, Run Temp: 140° C., Calibration Standard: traceable to NIST, Solvent: 1,2,4-Trichlorobenzene. BBF: Butyl branching frequency as measured by $^{13}$C-NMR. The value is the number of butyl branches per 1000 carbon atoms.

EXAMPLES

The following examples are put forth so as to provide those skilled in the art with a complete disclosure and description of how to make and use the methods and systems of the invention, and are not intended to limit the scope of that which the inventors regard as their invention.

Example 1

This example compares gel reduction for different arrangements of screens in the screen pack. Polyethylene pellets were extruded into a film without any additives. The polythene pellets were Metallocene Resins having a density from 0.9135 to 0.9185 g/cm$^3$, an $I_2$ value of from 0.30 to 0.60 dg/min, and $I_{21}/I_2$ value of from 25 to 35.

The quantity of gels for the resultant film was determined using an Optical Control Systems (OCS) gel counting apparatus. The OCS gel counting apparatus converts pellets into film and uses an advanced camera system to detect optical defects, including gels, in the film. Settings are adjusted to count defects within specific ranges of size. The smallest defect typically detected is about 50 μm in size. Table 2 shows the speciation of gel counts by size. Total gel count indicates the total number of gels larger than 50 μm. The ">200 μm" count indicates the total number of gels that are larger than 200 μm in size. Total defect area (TDA) is a measure of the concentration of gels in the film based on the gel count, gel size, and total film area assessed. The TDA indicates the area of gels divided by the area of film and is reported in parts per million (ppm). The TDA is reported along with the basis for the measurement. For example, Table 2 indicates TDA50, which is the total defect area including gels larger than 50 μm in size.

Table 1 shows the extrusion conditions, and Table 2 shows the gel count data. As illustrated, inclusion of intermediate screens of 100 mesh or tighter are particularly useful for gel reduction. In particular, including intermediate screens that include a 20-mesh screen sandwiched between two screens of 100 mesh or tighter was particularly beneficial for gel reduction.

TABLE 1

| Filter Arrangement | Minimum Screen Size (micron) | Differential MP Discharge and Die (psi) | Extruder Screw Speed RPM | Rate LB/HR | SEI (kWh/kg) |
|---|---|---|---|---|---|
| 5 (20 × 20) | 635 | 1018 | 260 | 180 | 0.186 |
| 20-250-100-20 | 61 | 1232 | 260 | 150 | 0.180 |
| 20-400-100-20 | 33 | 1456 | 260 | 150 | 0.191 |
| 20-100-20-100-20 | 140 | 1163 | 260 | 180 | 0.185 |
| 20-250-20-250-100-20 | 61 | 1413 | 260 | 150 | 0.183 |
| 20-250-20-250-100-20 | 61 | 1429 | 200 | 150 | 0.174 |
| 20-100-20-100-20 | 140 | 1403 | 200 | 180 | 0.175 |
| 20-100-20-100-20 | 140 | 1220 | 200 | 150 | 0.173 |
| 20-100-20-100-20 | 140 | 1199 | 260 | 150 | 0.183 |
| 5(20 × 20) | 635 | 1142 | 260 | 180 | 0.189 |
| 5(20 × 20) | 635 | 1174 | 200 | 180 | 0.175 |

TABLE 2

| Filter Arrangement | Differential MP Discharge and Die from Standard (psi) | Gel Count OCS TDA50 ppm | Gel Count ≤200 | Gel Count ≥200 ≤600 | Gel Count ≥600 ≤1200 | Gel Count ≥1200 |
|---|---|---|---|---|---|---|
| 5 (20 × 20) | 1018 | 165.5 | 21688 | 5842 | 385 | 50 |
| 20-250-100-20 | 1232 | 45.0 | 6671 | 1831 | 99 | 8 |
| 20-400-100-20 | 1456 | 15.5 | 4907 | 582 | 14 | 1 |
| 20-100-20-100-20 | 1163 | 31.8 | 5386 | 1413 | 48 | 2 |
| 20-250-20-250-100-20 | 1413 | 45.0 | 6882 | 1549 | 64 | 17 |
| 20-250-20-250-100-20 | 1429 | 54.4 | 12228 | 2676 | 40 | 8 |
| 20-100-20-100-20 | 1403 | 37.6 | 6205 | 1633 | 67 | 3 |
| 20-100-20-100-20 | 1220 | 48.0 | 9097 | 2236 | 67 | 1 |
| 20-100-20-100-20 | 1199 | 45.3 | 6102 | 1698 | 134 | 2 |
| 5 (20 × 20) | 1142 | 183.2 | 27443 | 7180 | 384 | 46 |
| 5 (20 × 20) | 1174 | 847.9 | >10758 | >3017 | >242 | >41 |

Example 2

This example illustrates control of scission for different melt temperatures in the extruder with resultant gel reduction. Polyethylene pellets were extruded into a film without any additives. The polyethylene pellets were Metallocene Resins having a density from 0.914 to 0.917 g/cm$^3$, an $I_2$ value of from 0.15 to 1.10 dg/min, and $I_{21}/I_2$ value of from 25 to 35.

The quantity of gels in the resulting film was determined using OCS gel counting apparatus that converts pellets into film and uses an advanced camera system to detect optical defects, including gels, in the film. Settings are adjusted to count defects within specific ranges of size. The smallest defect typically detected is about 50 μm in size. The equipment can be configured to only count the gels larger and in this case it is 200 μm in size. Table 3 shows the speciation of gel counts by size. Total gel count indicates the total number of gels larger than 200 μm. For example, the "200-600 μm" count indicates the total number of gels that are larger than 200 μm in size, but smaller than 600 μm. Total defect area (TDA) is a measure of the concentration of gels in the film based on the gel count, gel size, and total film area assessed. The TDA indicates the area of gels divided by the area of film and is reported in parts per million (ppm). The TDA is reported along with the basis for the measurement. For example, Table 3 indicates TDA200, which is the total defect area including gels larger than 200 μm in size.

Table 3 shows the extrusion conditions, flow indices, and gel count data. As illustrated, increasing the melt temperature resulted in a corresponding reduction in the flow index and gel count.

TABLE 3

| Melt Index from Reactor Dg/min | Extruder Rate Lb/hr | Screw Speed RPM | Melt Index after Extrusion Dg/min | Melt Temp F. | OCS Gels 200-600 um | OCS Gels 600-1200 um | OCS Gels >1200 um | OCS Gels Total | OCS TDA200 ppm |
|---|---|---|---|---|---|---|---|---|---|
| 0.43 | 80 | 175 | 0.72 | 483 | 138 | 5.7 | 0.8 | 144 | 15 |
| 0.25 | 80 | 175 | 0.68 | 495 | 98 | 1.5 | 0 | 99 | 7 |
| 0.95 | 80 | 175 | 0.97 | 454 | 1299 | 13.7 | 0 | 1313 | 93 |
| 1.02 | 80 | 175 | 0.99 | 449 | 869 | 13.5 | 0.3 | 883 | 66 |
| 0.23 | 80 | 175 | 0.64 | 496 | 166 | 3.5 | 0.5 | 170 | 14 |
| 0.93 | 80 | 175 | 0.93 | 463 | 599 | 17.7 | 0.7 | 617 | 53 |
| 0.23 | 80 | 175 | 0.40 | 487 | 243 | 9.8 | 0.7 | 253 | 23 |
| 0.98 | 80 | 175 | 0.95 | 443 | 616 | 7.8 | 0.3 | 624 | 46 |
| 0.45 | 80 | 175 | 0.73 | 487 | 132 | 4.5 | 0.3 | 137 | 12 |
| 0.43 | 100 | 150 | 0.47 | 448 | 629 | 24.3 | 1.5 | 655 | 63 |
| 0.25 | 100 | 150 | 0.26 | 470 | 1355 | 25.8 | 10.2 | 1391 | 117 |
| 0.95 | 100 | 150 | 0.93 | 415 | 806 | 17.3 | 1.8 | 825 | 67 |
| 1.02 | 100 | 150 | 0.90 | 406 | 374 | 22.3 | 1.0 | 397 | 43 |
| 0.23 | 100 | 150 | 0.23 | 475 | 336 | 61.8 | 35.8 | 434 | 181 |
| 0.93 | 100 | 150 | 0.87 | 417 | 608 | 25.6 | 1.5 | 635 | 61 |
| 0.23 | 100 | 150 | 0.22 | 480 | 560 | 52.9 | 31.6 | 645 | 162 |
| 0.98 | 100 | 150 | 0.96 | 407 | 757 | 12.3 | 1.5 | 771 | 56 |
| 0.45 | 100 | 150 | 0.42 | 446 | 697 | 11.3 | 0.3 | 709 | 50 |

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used. In the preceding description and the appended claims, the singular forms "a," "an" and "the" include plural referents unless otherwise specified.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited; in the same way, ranges from any upper limit may be combined with any other upper limit to recite a range not explicitly recited.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

What is claimed is:

1. A method for controlling polymer chain scission in an extrusion system, comprising:
    melting a polyolefin resin in extruder at a first melt temperature to form a first melt;
    passing the first melt through a screen pack;
    forming the first melt into a first polyolefin product;
    melting additional polyolefin resin of the same grade in the extruder at a second melt temperature to form a second melt, wherein the second melt temperature differs from the first melt temperature by 5° C. or more to control chain scission in the extruder;
    passing the second melt through the screen pack; and
    forming the second melt into a second polyolefin product, wherein the screen pack comprises a plurality of screens arranged in series, wherein the screens comprise an inlet screen having a size from 20 mesh to 80 mesh, two or more intermediate screens having a size of 100 mesh or greater, and an outlet screen having a size from 20 mesh to 80 mesh, wherein a throughput channel in the screen pack has a cross sectional area of at least 344 cm$^2$.

2. The method of claim 1, wherein the two or more intermediate screens comprising a screen having a size from 20 mesh 80 mesh sandwiched between screens of 100 mesh or larger.

3. The method of claim 1, wherein the two or more intermediate screens comprise at least one screen having a size from 200 mesh to 250 mesh.

4. The method of claim 1, wherein the second melt temperature is greater than the first melt temperature such that the second polyolefin product has a molecular weight that is less than a molecular weight of the first polyolefin product.

5. The method of claim 1, wherein the second melt temperature is less than the first melt temperature such that the second polyolefin product has a molecular weight that is greater than a molecular weight of the first polyolefin product.

6. The method of claim 1, wherein the second melt temperature differs from the first melt temperature by 20° C. or more.

7. The method of claim 1, wherein the extruder is a single screw extruder or a twin screw extruder.

8. The method of claim 1, further comprising passing at least one of the first melt or the second melt through a pelletizer configured to form the first melt and/or the second melt into pellets.

9. The method of claim 1, further comprising passing at least one of the first melt or the second melt through a die configured to form the first melt and/or the second melt into a polyolefin film.

10. The method of claim 1, wherein the polyolefin resin comprises a polyolefin made from ethylene monomers or branched higher alpha-olefin monomers containing from 3 to 20 carbon atoms.

11. The method of claim 1, wherein the polyolefin resin comprises a polyolefin having a density of from 0.910 g/cm$^3$ to 0.975 g/cm$^3$.

12. The method of claim 1, wherein the polyolefin resin comprises a polyolefin having a melt index ranging from 0.1 g/10 min to about 1000 g/10 min.

13. The method of claim 1, wherein at least one of the first polyolefin product or second polyolefin product comprises pellets, pipe, sheet, or a film.

14. A method for controlling polymer chain scission in an extrusion system, comprising:
    providing a polyolefin resin having a molecular weight;
    selecting a melt temperature for an extruder to cause scission of the polyolefin with decrease in molecular weight;
    melting the polyolefin resin in the extruder at the melt temperature to form a melt;
    forming the melt into a polyolefin product; and
    passing the melt through a screen pack comprises a plurality of screens arranged in series, wherein the screen comprise an inlet screen having a size from 20 mesh to 80 mesh, two or more intermediate screens having a size of 100 mesh or greater, and an outlet screen having a size from 20 mesh to 80 mesh, wherein a throughput channel in the screen pack has a cross sectional area of at least 344 cm$^2$.

15. The method of claim 14, wherein the extruder is a single screw extruder or a twin screw extruder.

16. The method of claim 14, wherein the polyolefin resin comprises a polyolefin made from ethylene monomers or branched higher alpha-olefin monomers containing from 3 to 20 carbon atoms.

17. The method of claim 14, wherein the polyolefin resin comprises a polyolefin having a density of from 0.910 g/cm$^3$ to 0.975 g/cm$^3$.

18. The method of claim 14, wherein the polyolefin product comprises pellets, pipe, sheet, or a film.

* * * * *